United States Patent Office 3,501,824
Patented Mar. 24, 1970

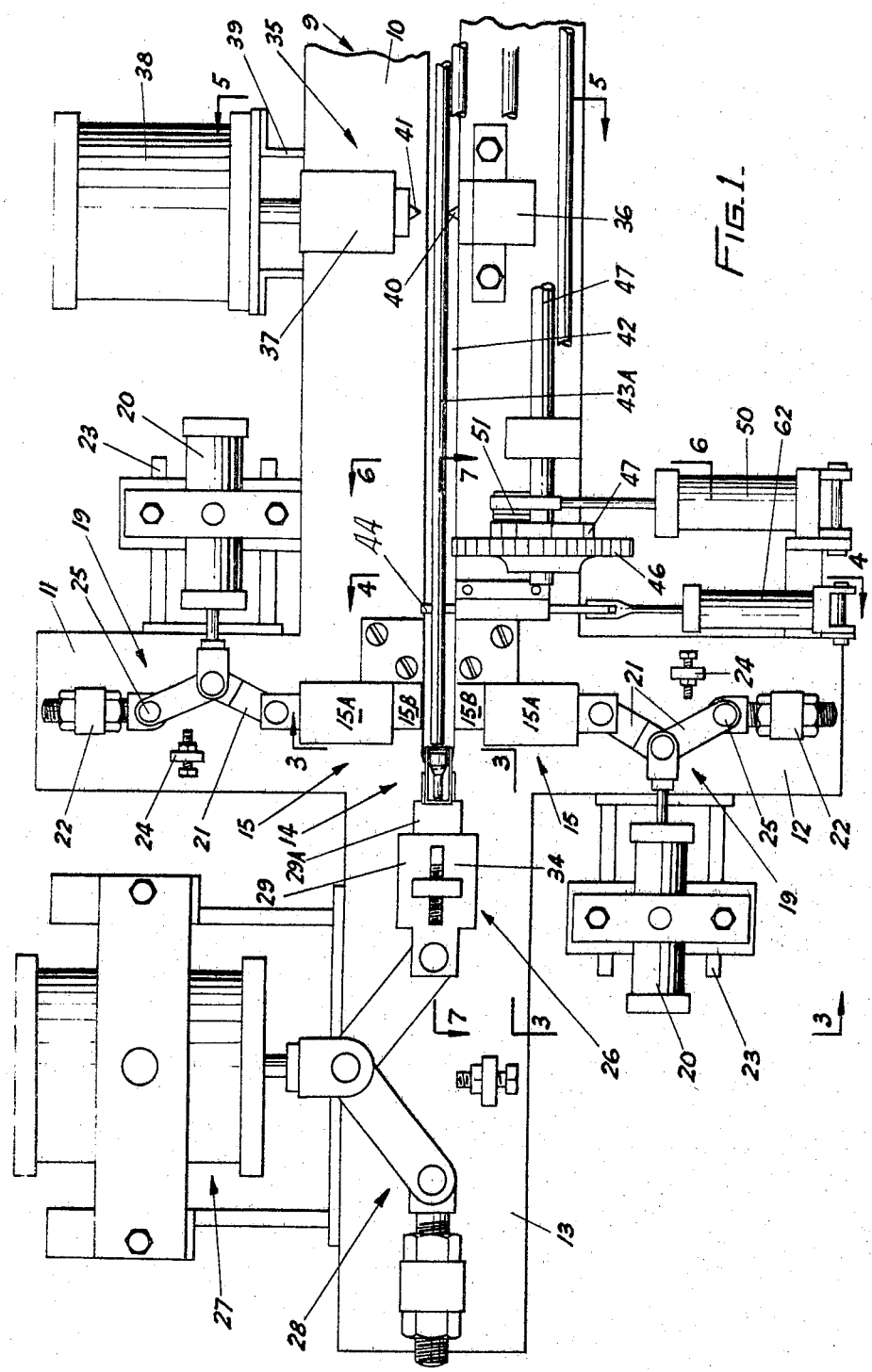

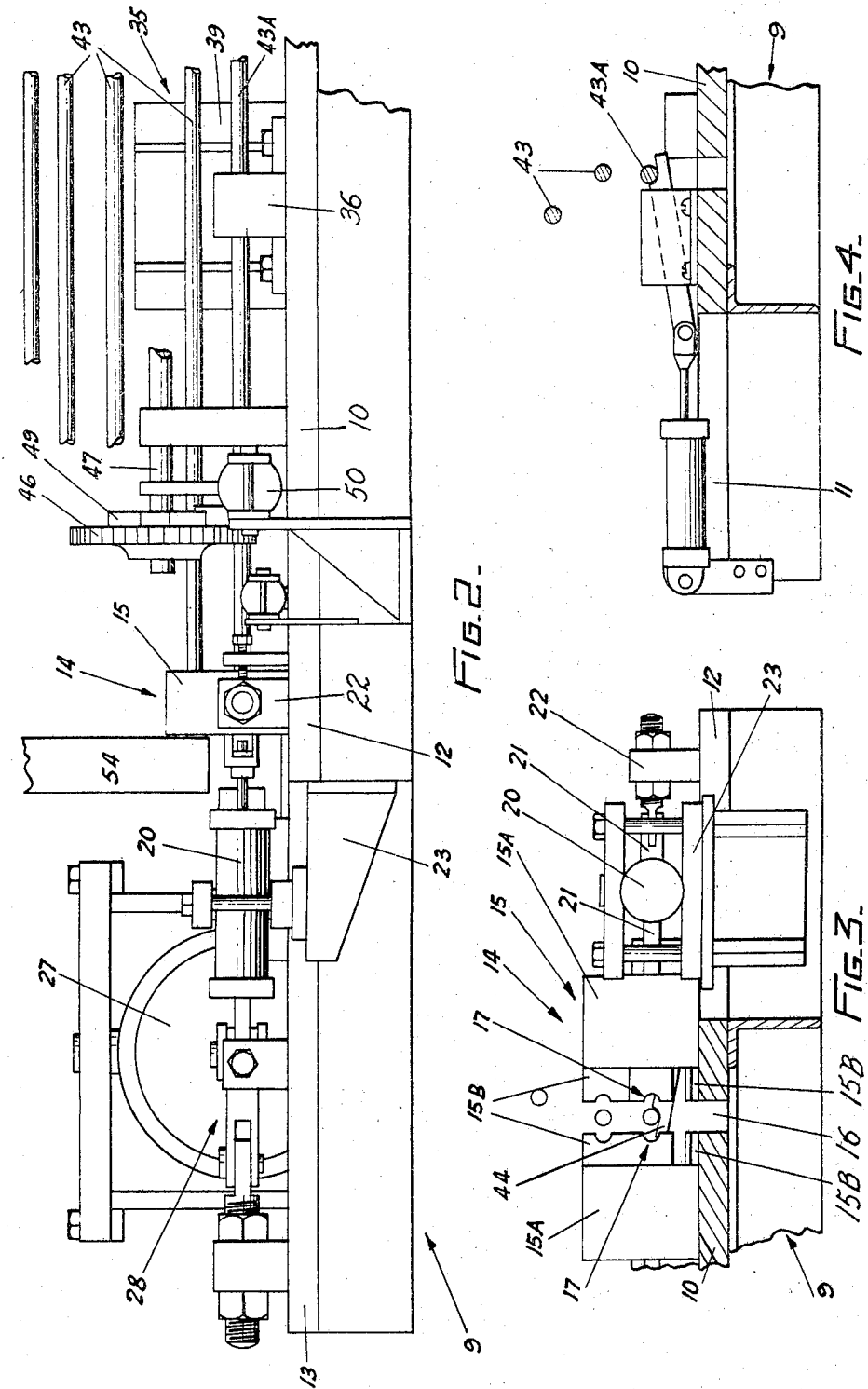

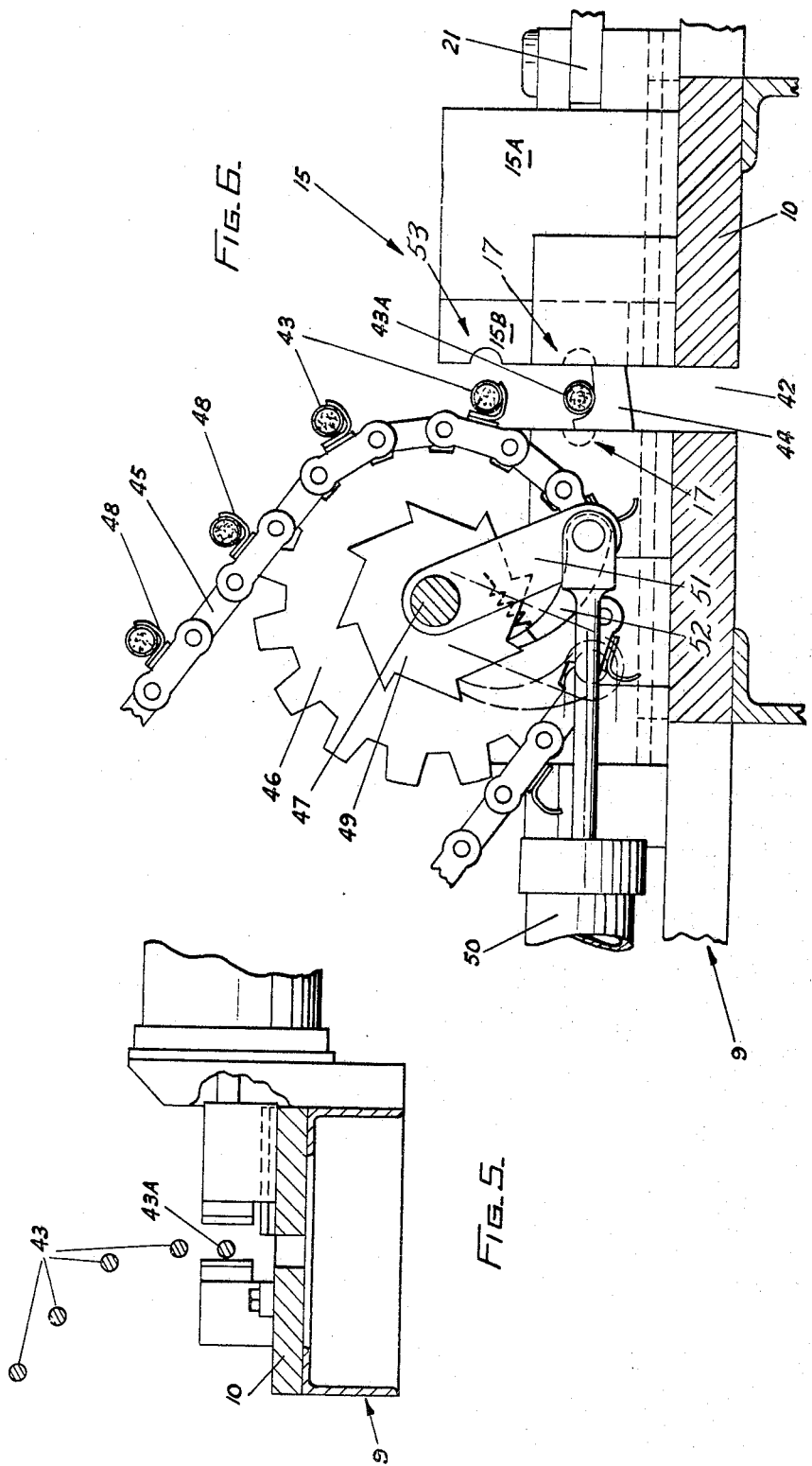

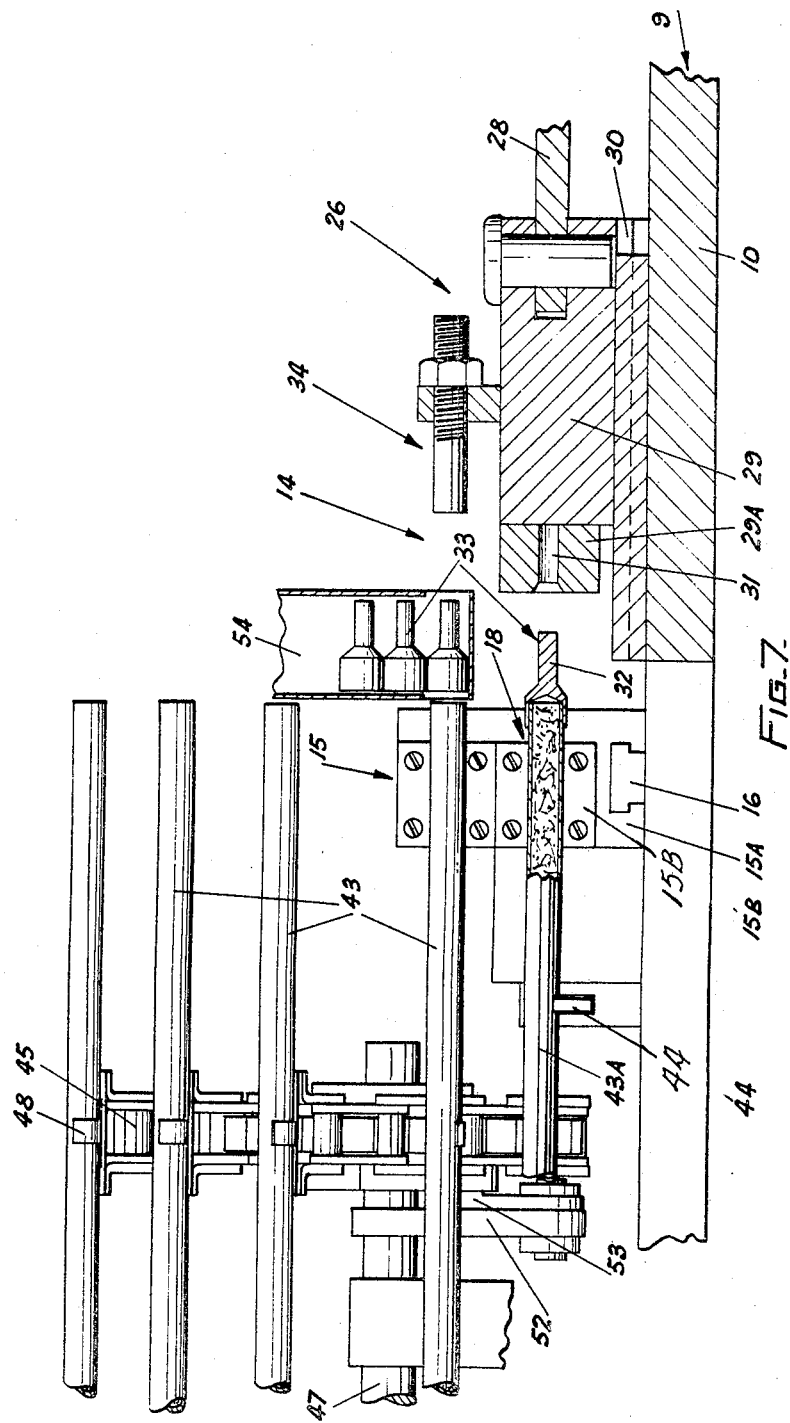

3,501,824
MACHINE FOR ASSEMBLING AND SECURING END CAPS TO TUBES
David George Holloway, Yowie Bay, New South Wales, and Cedric Victor Whitehouse, Beverley Park, New South Wales, Australia, assignors to Vida-Weld Pty. Limited, Taren Point, near Sydney, New South Wales, Australia, a corporation of New South Wales
Filed Mar. 20, 1967, Ser. No. 624,424
Claims priority, application Australia, Mar. 28, 1966, 3,502/66
Int. Cl. B23p *19/04;* B23q *27/10*
U.S. Cl. 29—203                    6 Claims

ABSTRACT OF THE DISCLOSURE

An apparatus is provided for securing end caps to tubes, the tubes being freely passable through a passage formed by two opposed anvil die elements which are movable towards and away from the tubes, the caps being loosely applied to the tubes and penetrable into the passage for only a limited portion of the length thereof, the caps being engaged by a press die which is moved towards the anvil die elements to force the end cap part way into the tube passage to swage the end cap onto the tube.

---

Figure 8:
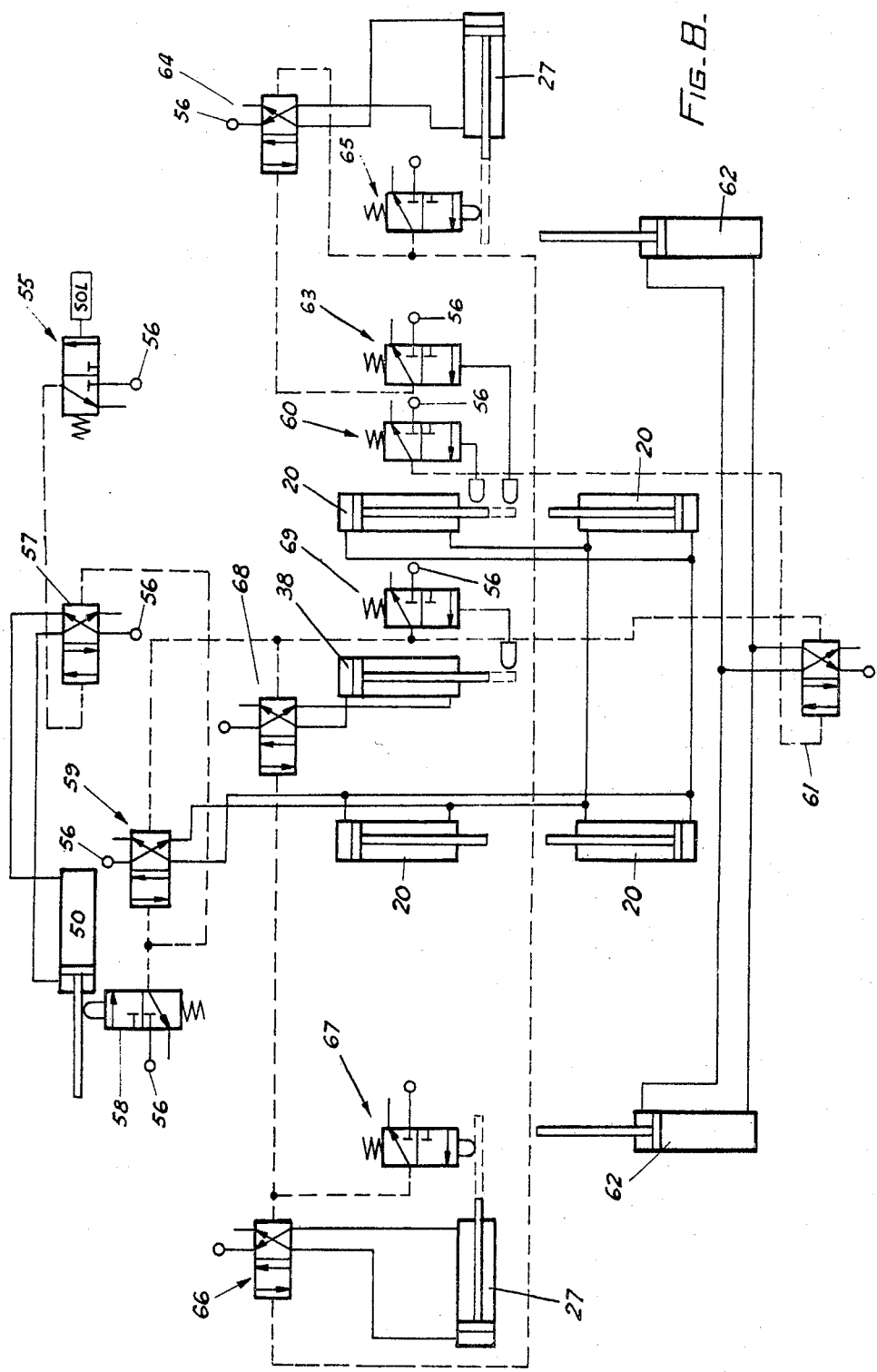

This invention relates to the end capping of tubes, and more particularly to the manufacture of welding electrodes of the kind comprising a tube closed at both ends and packed with core material and with a stem extending coaxially from one end of smaller diameter than the outer diameter of the tube. The purpose of that stem is to enable the electrode to be gripped in a conventional electrode holder as used for bare or coated wire electrodes.

Hitherto, such electrodes have been made by capping the tube with a cap having a stem extending integrally from it.

Hitherto the capping of electrode tubes has been carried out manually and has been a time consuming and therefore expensive operation.

An object of the present invention is to provide apparatus for the application of stemmed end caps to previously filled electrode tubes.

The invention extends not only to said apparatus but also the electrodes when made thereby.

The invention consists in apparatus for securing end caps to tubes comprising an anvil die defining a tube passage through which the tube to be capped may freely pass but which will only admit the cap to be applied to the tube for a limited distance less than the length of the tube passage, a press die adapted to engage a cap when loosely applied to one end of the tube extending through the tube passage and means to move the press die towards the anvil die to force the end cap part way into the tube passage thereby to swage the end cap on to the tube.

According to preferred embodiments of the invention the anvil die comprises two co-acting anvil die elements which are movable transversely of the tube and which come together to define the tube passage, and the apparatus includes means to effect the automatic and synchronized operation of the dies.

According to further preferred embodiments of the invention two similar sets of die elements are provided, one of which acts to put a cap on one end of a double length electrode tube and the other of which acts to put a cap on the opposite end of the double length tube, in combination with guillotine devices operable to cut the double length tube in halves and at the same time squeeze the cut ends together to prevent the escape of core material.

By way of example, an embodiment of the above-described invention is described hereinafter with reference to the accompanying drawings, wherein:

FIGURE 1 is a plan view of an electrode capping apparatus according to the invention with its right hand end portion removed, FIGURE 2 is a side elevation of the apparatus portion subject of FIGURE 1, FIGURE 3 is a partly sectioned elevation taken on line 3—3 of FIGURE 1, FIGURE 4 is a partly sectioned elevation taken on line 4—4 of FIGURE 1, FIGURE 5 is a sectional elevation taken on line 5—5 of FIGURE 1, FIGURE 6 is a sectional elevation taken on line 6—6 of FIGURE 1, and drawn to a larger scale, FIGURE 7 is a sectional elevation taken on line 7—7 of FIGURE 1 and drawn to a larger scale, FIGURE 8 is a hydraulic circuit diagram of the means which effect the synchronized operation of the die elements of the apparatus of FIGURES 1 to 7.

The various operative components of the illustrated embodiment of the invention are mounted upon a supporting structure in the form of a rigid metal table 9.

The illustrated apparatus, including the table 9 is symmetrical about its transverse center line and it will be understood that the right-hand end of the apparatus which is not illustrated in the drawings is in effect a mirror image of the left-hand illustrated end.

With the foregoing in mind, it will be seen that the top of the table 9 comprises a relatively narrow rectangular center portion 10, with four small rectangular projections extending therefrom, namely, a left-hand rearward projection 11, a left-hand forward projection 12 and corresponding right-hand rearward and right-hand forward projections, which are not shown. The table top also comprises a left-hand end portion 13 disposed outboard of the projections 11 and 12 and a corresponding right-hand end portion (not shown).

A left-hand set of die elements 14 is mounted on the left-hand end of the table-top center portion 10.

The left-hand set of die elements 14 comprise two anvil die elements 15 each in the form of a metal block 15A with a replaceable face piece 15B able to slide towards the other along guide means extending transversely of the table 9 along a line substantially coincident with the center line of the left-hand rearward and left-hand forward projections 11 and 12 respectively. Each said guide means may comprise a T sectioned rib 16 (see FIGURE 3) projecting upwardly from the table-top 9 which co-acts with a similarly sectioned slot formed in the underface of each anvil die element 15.

The two anvil die elements 15 may slide into contact one with the other whereupon their mating faces substantially coincide with the longitudinal center line of the table 9. Each of those mating faces has a groove 17 of semi-circular cross-section formed in it such that when the anvil die faces are in contact a substantially horizontal electrode tube passage of circular cross-section is defined which extends in the longitudinal direction of the table 9. Each of the groove 17 is flared at its outer end so that the tube passage defined by the anvil die elements 15 when they are brought together has a bell-mouth or tapered entry 18 (see FIGURE 7).

The anvil die elements 15 are movable to and fro by means, for example, of toggle mechanism 19 which are collapsed or straightened by means of pneumatic rams 20 (termed "anvil die rams" hereinafter).

Each toggle mechanism 19 comprises two rigid toggle links 21, pivotally connected each to each at their contiguous ends and which at their other ends are pivotally connected to an anvil die element 15 on one hand and a fixed anchorage 22 on the other. Thus, the angular relationship between the two toggle links 21 of each toggle mechanism 19 determines the distance of the associated anvil die element 15 from its fixed anchorage 22.

The pneumatic rams 20 are fixedly supported on outrigger brackets 23 and it will be clear from the drawings that when the piston rods of the rams 20 are extended the toggle links 21 are substantially in alignment and the die anvil elements 15 are together. On the other hand, when the pneumatic rams 20 are retracted, the toggle links 21 of each mechanism 19 are disposed at a considerable angle each to each and the anvil die elements 15 are separated.

The straightened position of each toggle mechanism 19 may be determined by a suitable, preferably adjustable, stop 24 against which one of the toggle links 21 abuts when the links are in alignment. For preference, each stop 24 comprises a steel block welded or otherwise secured to the table-top pierced by an abutment screw in substantial alignment with the piston rod of its associated ram 20.

For preference, each of the fixed anchorages 22 is of similar construction, that is to say, it comprises an anchorage block pierced by an adjustment screw the head of which is pierced by a pivot pin 25 whereby one of the toggle links 21 is pivoted to the anchorage 22.

Each of the press die elements, of which only the left-hand element reference 26 is shown in the drawings, is also operated in a similar manner by means of pneumatic rams 27 (termed press die rams hereinafter) and toggle mechanisms 28.

Each of the press die elements comprises a die block 29 slidable on a T section guide 30 with a replaceable face element 29A thereon. The element 29A has a recess 31 in it adapted to accommodate the stem 32 of an electrode cap 33. Each press die element 29 also carries a cap transfer probe 34, the function of which will be described in detail hereinafter.

Guillotine devices 35 are provided comprising a fixed jaw 36 secured to the center portion 10 of the table 9 and a coacting movable jaw 37 secured to one end of the piston rod of a guillotine pneumatic ram 38 supported on an outrigger bracket 39. Both the jaws 36 and 37 comprise a metal block with an upright V sectioned rib 40 and 41 respectively formed thereon (or on replaceable face plates on the blocks). The ribs 40 and 41 are disposed with the tips of the ribs directed towards each other and lying in the same upright plane.

The center portion 10 of the table 9 is split by a longitudinally extending discharge slot 42 through which an electrode tube 43A may fall and which is disposed directly underneath the tube passageways defined by the two sets of anvil die elements 15.

A rod support comprising an arm 44 spans the slot 42 adjacent to each pair of anvil die elements 15. The rod supports are such that the double length electrode tube 43A resting on the arms 44 is positioned such that the anvil die elements 15 may come together with the electrode tube 43A on the arms 44 disposed within the tube passages.

According to simpler embodiments of the invention than the one now being described, each rod support may comprise a fixed arm and a double length electrode tube with end caps loosely applied to it may be placed manually upon the fixed arms and the apparatus may then be put into motion to secure the end caps to the electrode tube.

However, according to the illustrated embodiment of the invention electrode, the arms 44 are retractable and function in association with tube and cap supply means for the automatic infeed of caps and double length tubes and the automatic discharge of finished electrodes through the discharge slot 42.

Said tube and cap supply means may comprise a pair of spaced apart carrier chains 45 riding upon chain sprockets 46 disposed on a shaft 47 extending in the longitudinal direction of the table 9 between the two forward projections thereof.

Each of the carrier chains 45 is provided with tube support hooks 48 whereby a plurality of double length electrode tubes 43 may be conveyed. For clarity of illustration, the chains 45 (and in some cases the sprockets 46) have been omitted from FIGURES 1 to 5.

The chains 45 may be loaded with tubes 43 in any convenient manner at a station remote from the apparatus and are then conveyed by the chains until each falls from the chains as it approaches the underside of the sprockets 46. The tube 43 which has so fallen is referenced 43A in the drawings. It will be noticed that it falls directly on to the rod support arms 44 which are recessed in a manner ensuring that the tube 43A comes to rest in the required position.

The carrier chains 45 operate in concert with the other components of the apparatus and to that end may be borne through one pitch distance by means of a ball and ratchet indexing device comprising a star wheel 49 fixed to the shaft 47, an indexing pneumatic ram 50, a swinging stirrup 51 rotatably mounted on the shaft 47 and connected at its free end to the piston rod of the indexing ram 50 and a spring loaded pawl 52 mounted on one side of the stirrup 51 and adapted to engage the teeth of the star wheel 49.

The anvil die elements 15 define electrode tube locating grooves 53 which ensure that the bottom electrode tube 43 at the end of each indexing operation is precisely positioned in alignment with the outlet of a cap magazine 54. Thus, during each operating cycle, a cap 33 ejected by the cap transfer probe 34 is applied to one or other end of the lowermost tube 43 at the same time as the press die elements move to swage the previously applied cap on the tube 43a. The magazine 54 may be fed with the caps 33 in correct disposition by means of any suitable parts feeding mechanically, for example, conventional mechanisms of the vibrating hopper type which suitably co-direct the parts being fed as they travel upwardly along a helical path and then deliver the correctly aligned parts into the magazine 54.

The manner in which the above-described apparatus operates is described below.

Assuming that the carrier chains 45 are already loaded with electrode tubes 43, that the magazine 54 is loaded with caps 43 and that an electrode tube 43A with caps loosely applied to each end is resting on the rod support arms 44, that is to say, assuming the apparatus is in the loaded condition as shown in FIG. 7 and is stationary as at the commencement of an operating cycle, then it may then be put into operation by energizing a spring loaded solenoid starting valve 55 which then shifts against the effect of its return spring to put a source of compressed air 56 into communication with an air operated index ram control valve 57.

The indexing ram control valve 57 is thus caused to change over from the position illustrated in FIG. 8 to supply air from the source 56 to one end of the cylinder of the indexing pneumatic ram 50 while connecting the other end of that ram to exhaust. The ram 50 then retracts so cocking the ball and ratchet mechanism in readiness for the next indexing or electrode feeding operation. When the indexing ram 50 retracts as aforesaid a suitable cam element on its piston rod (not shown) conducts the operating plunger of a spring loaded mechanically operated anvil die pilot valve 58 which then supplies air to an anvil die control valve 59 which as a consequence changes position to connect air from the source 56 to the outer ends of each of the anvil die rams 20 and, at the same time, connects the inner ends of the cylinders of those rams to exhaust. Thus, the anvil die elements are brought together in readiness for the swaging operation.

At the same time, the valve 58 supplies valve operating air to the indexing ram control valve 57 and does not operate immediately as it is still being supplied with ram operating air from the solenoid starting valve 55.

Once the anvil die elements have been brought together, a cam associated with the piston rod of one of the anvil die rams 20 contacts the striker of a rod support pilot valve 60 which, thus, changes over from the position shown in FIG. 8 to send air to one side of a rod support control valve 61 which then operates to provide air to the rod support rams 62 which retract and withdraw the rod support arms 44 so allowing the last finished electrodes to fall through the discharge slot 42.

When the anvil die rams 20 are almost fully extended, a press die pilot valve 63 is struck and then feeds air to a press die ram operating valve 64 which changes over and feeds air to one end of the press die rams 27 and exhausts air from the other end of that ram. As a result, one of the press die rams 27 operates and a cap is swaged on one end of the tube 43A.

When the said one press die ram 27 completes its travel it strikes a second press die ram pilot valve 65 which is, thus, caused to feed air to a second press die ram control valve 66 which in a similar manner causes the other press die ram 27 to operate and to swage an end cap on the other end of the tube 43A.

At the completion of its operation, said other press die ram 27 strikes a guillotine pilot valve 67 which changes over to feed air to a guillotine control valve 68 which, in turn, causes the guillotine ram 38 to operate and to sever the capped tube 43A.

At the end of the operation of the guillotine ram 38 it strikes a return pilot valve 69 which then supplies return air to valves 59, 68, 61, 64 and 66 which all revert to the illustrated positions and, thus, cause the various rams controlled by them to retract in readiness for the next cycle of operations. At the end of the cycle of operations the electrical supply to the solenoid starting valve is interrupted enabling it to return and, thus exhaust one end of the indexing ram control valve 57. As a result the indexing ram control valve 57 returns to its illustrated position so causing the indexing ram 50 to shift to its illustrated position thereby feeding the loosely capped tube 43 to the rod supports 44 in readiness for the next cycle of operations. If desired, the completion of that feeding operation may be utilized by means of an appropriate cam operated electrical switch to re-energize the solenoid on the starter switch 55 so that the next cycle of operations is initiated automatically.

It will be appreciated that the above-described embodiment of the invention has been described purely by way of example, and, in particular, pneumatically operated die elements may be replaced by electro-mechanically operated elements (that is to say, elements powered by solenoids instead of pneumatic rams).

Also, if desired, the various die elements may be operated by mechanical means, for example, a suitable array of interconnected cams and followers operated by a main drive or cam shaft which is itself connected to a driving motor by way of a so-called single revolution clutch, the arrangement being such that a predetermined number of revolutions of the main shaft effects one cycle of operations.

What is claimed is:

1. Apparatus for securing end caps to tubes comprising an anvil die defining a tube passage through which the tube to be capped may freely pass but which will only admit the cap to be applied to the tube for a limited distance less than the length of the passage, a press die adapted to engage a cap when loosely applied to one end of the tube extending through said passage and means to move the press die towards the anvil die to force the end cap part way into the tube passage thereby to swage the end cap onto the tube.

2. Apparatus according to claim 1 wherein said anvil die comprises two co-acting anvil die elements which are movable transversely of the tube to be capped and which come together to define the tube passage.

3. Apparatus according to claim 1 comprising a further anvil die and a further press die arranged such that one set of said dies may apply a cap to one end of a tube and the other set of said dies may apply a cap to the other end of the tube.

4. Apparatus according to claim 3 including guillotine devices disposed between the two sets of dies to sever a tube extending from one set to the other.

5. Apparatus according to claim 1 including means to feed tubes into the tube passage.

6. Apparatus according to claim 2 comprising a pneumatic ram and toggle mechanism for moving each said anvil die element.

References Cited

UNITED STATES PATENTS

| | | | |
|---|---|---|---|
| 2,655,718 | 10/1953 | Haegele | 29—211 X |
| 3,136,042 | 6/1964 | Horn et al. | 29—203 |
| 3,382,646 | 5/1968 | Leudtke et al. | 53—128 |

THOMAS H. EAGER, Primary Examiner

U.S. Cl. X.R.

29—208, 211; 53—128